United States Patent [19]

Kagawa

[11] Patent Number: 5,469,413
[45] Date of Patent: Nov. 21, 1995

[54] MAGNETO-OPTIC RECORDING SYSTEM AND ASSOCIATED CONTROLLABLE HEAT SOURCE

[75] Inventor: Hitoshi Kagawa, Itami, Japan

[73] Assignee: Mitsubishi Denki Kabushiki Kaisha, Tokyo, Japan

[21] Appl. No.: 178,817

[22] Filed: Jan. 7, 1994

[30] Foreign Application Priority Data

Jan. 12, 1993 [JP] Japan .................................. 5-003358
Dec. 28, 1993 [JP] Japan .................................. 5-336185

[51] Int. Cl.⁶ .................................................. G11B 11/00
[52] U.S. Cl. .................................................. 369/13; 360/114
[58] Field of Search .................... 369/13, 14, 44.14, 369/54, 58, 106, 116; 360/114, 59; 365/122

[56] References Cited

U.S. PATENT DOCUMENTS

| | | | |
|---|---|---|---|
| 4,670,865 | 6/1987 | Hatano | 369/13 |
| 5,091,896 | 2/1992 | Takeyama | 369/13 |
| 5,231,614 | 7/1993 | Shindo et al. | 369/13 |

FOREIGN PATENT DOCUMENTS

| | | |
|---|---|---|
| 422783 | 9/1990 | European Pat. Off. . |
| 600698 | 11/1993 | European Pat. Off. . |
| 54-83404 | 7/1979 | Japan . |
| 61-133034 | 6/1986 | Japan . |
| 3256234 | 11/1991 | Japan . |

*Primary Examiner*—Ali Neyzari
*Attorney, Agent, or Firm*—Leydig, Voit & Mayer

[57] ABSTRACT

A magneto-optic recording system writes information into a magneto-optic disc by applying a magnetic field to a selected position on the disc while directing a laser beam onto the disc. The laser beam is amplitude-modulated with a test pulse signal including a number of different amplitude pulses to write the test pulse signal in the disc. The test pulses thus written into the disc are read out and the smallest amplitude test pulse which has been read out from the disc is determined. The smallest amplitude depends on the temperature of the disc. The disc is heated in accordance with the determined smallest amplitude.

11 Claims, 5 Drawing Sheets

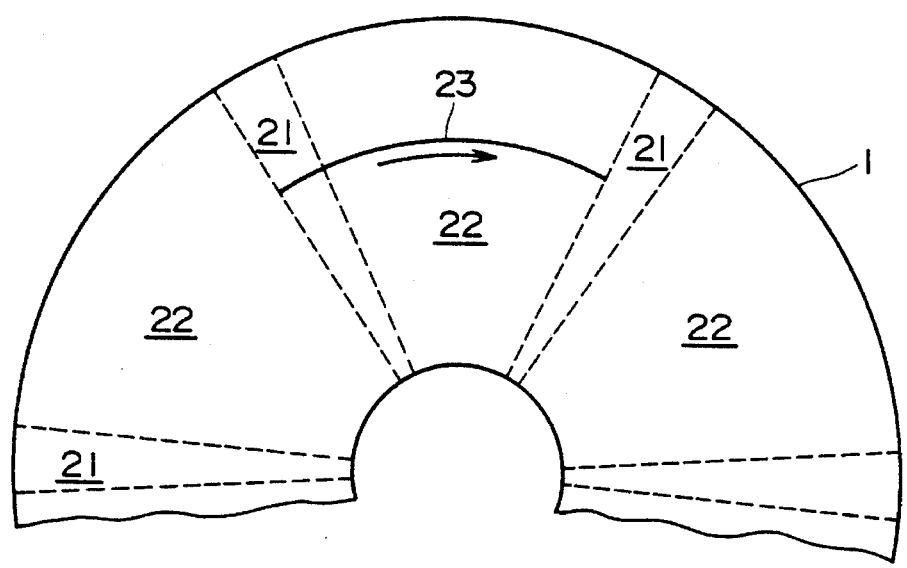
FIG. 2
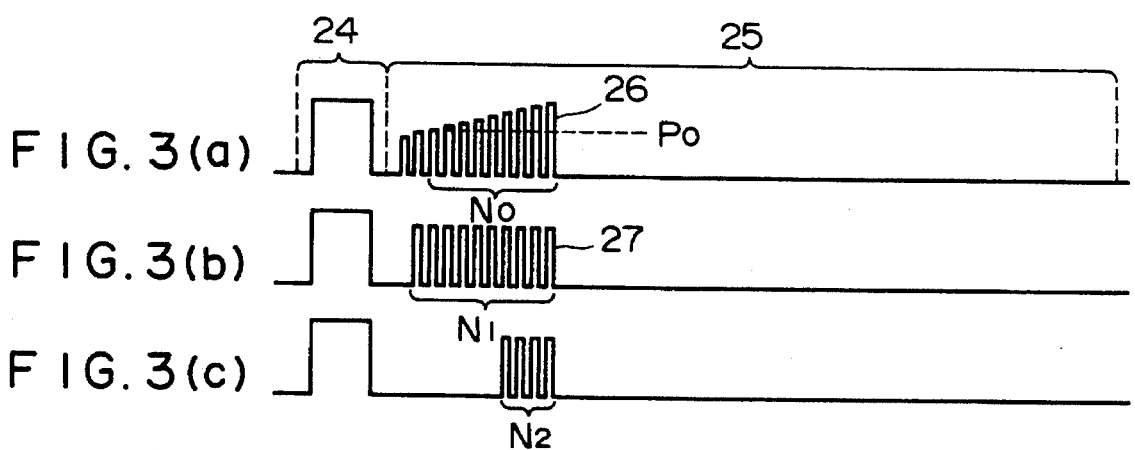
FIG. 3(a)
FIG. 3(b)
FIG. 3(c)

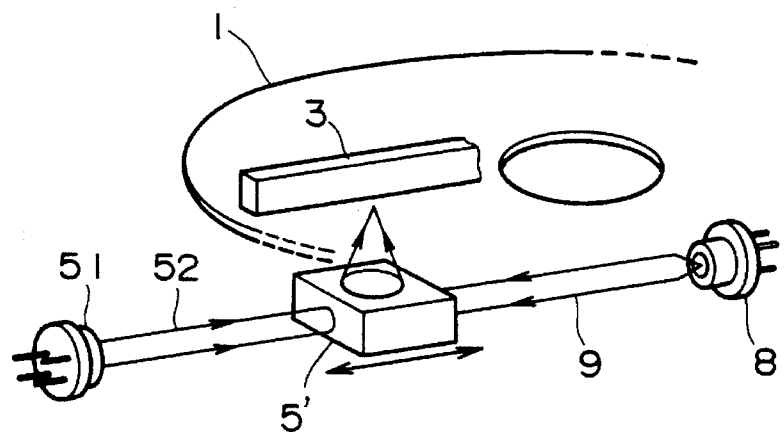
F I G. 5
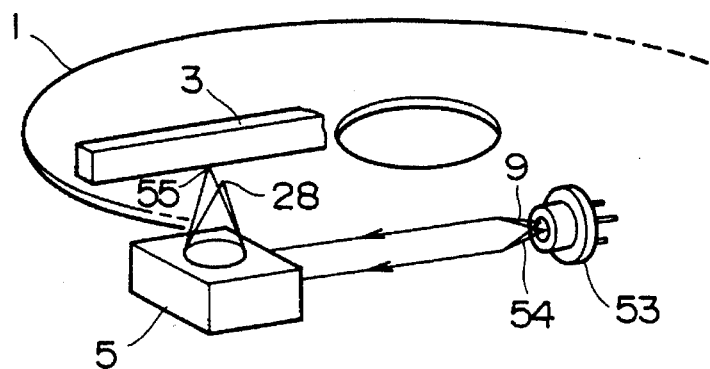
F I G. 6
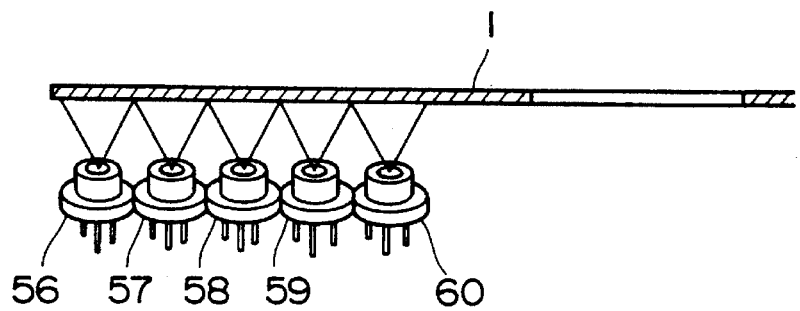
F I G. 7

MAGNETO-OPTIC RECORDING SYSTEM AND ASSOCIATED CONTROLLABLE HEAT SOURCE

The present invention relates to a signal recording system which takes advantage of magneto-optic effects.

BACKGROUND OF THE INVENTION

Heating a recording medium placed within a magnetic field to a temperature above its Curie point by irradiating it with a semiconductor laser beam causes changes in polarization rotation characteristic. This effect is utilized to record signals. As a matter of course, the lower the temperature of the recording medium due to low ambient temperature, the more thermal energy is required for raising the recording medium to the Curie point.

Japanese Unexamined Patent Publication No. HEI 3-256234 discloses an optical recording/reproducing system which includes a light source comprising a semiconductor laser, a control circuit for controlling the output power of the semiconductor laser, temperature sensing means disposed in the proximity of a recording medium, and a detecting circuit which detects the temperature from the temperature sensing means. The output from the detecting circuit is used to control the output from the semiconductor laser during erasure and recording. In other words, the temperature of the recording medium is measured for controlling the intensity of the recording laser beam in accordance with the measured temperature of the recording medium.

Japanese Unexamined Patent Publication No. SHO 54-83404 shows a recording medium which is pre-heated by irradiation with a laser beam, for example.

The intensity of the laser beam at a surface of a magneto-optic disc or record medium required to raise the disc temperature to the Curie point changes at a rate of, for example, $-0.03$ mW/°C. This means that when ambient temperature is low and, therefore, the disc temperature is low, particularly, during start-up, a large writing energy is necessary.

In determining the power of a semiconductor laser for use in the magneto-optic recording/reproducing system, the energy required at the disc surface and the energy coupling efficiency in the optical system must be considered. For example, assuming that the required energy at the disc surface is 10 mW and the coupling efficiency is 33.3%, the laser output should be 30 mW. Assuming further that the temperature of the disc at the start of recording changes over a range of, for example, 30° C., the required energy at the surface may change over a range of about 1 mW, and, accordingly, the semiconductor laser output must be able to vary over a range of about 3 m.

Accordingly, in the system of the aforementioned Japanese Unexamined Patent Publication No. HEI 3-256234, the recording laser beam intensity in low temperature conditions must be increased by 10% or more. Since the semiconductor laser must provide an output higher than its rated output, its reliability is lowered.

In the system shown in the aforementioned Japanese Unexamined Patent Publication No. SHO 54-83404, there is a danger that the pre-heating of the recording medium might raise the temperature of the medium above its Curie point so that recorded information could be erased.

SUMMARY OF THE INVENTION

According to the present invention, writing information into a magneto-optic disc is performed without need for increasing the semiconductor laser output and without danger of erasing already written information.

According to the present invention, a magneto-optic recording system includes, as conventional systems, a magneto-optic disc driven to rotate, means for applying a magnetic field to the disc, and a pickup head including means for directing a writing/reading laser beam toward selected locations on the disc.

The magneto-optic recording system further comprises means for heating the disc to a temperature within a range of temperatures which does not exceed the Curie point of the disc record medium and which can provide reliable writing of signals of predetermined amplitudes into the disc. (Hereinafter, this temperature range is referred to as desirable temperature range.) The temperature to which the disc is pre-heated preferably is a temperature above but near the lower limit of the desirable temperature range.

An example of a heating means measures the temperature of the disc to determine from the measurement the amount of thermal energy necessary to heat the disc to a desired temperature within the above-described desirable temperature range, and provides the required amount of thermal energy to the disc.

The measurement of the disc temperature may be carried out in the following manner. A laser beam amplitude-modulated with a test pulse signal comprising a plurality of test pulses of different amplitudes including a predetermined reference amplitude, is used to write the test pulses into the disc, then the written test pulses are read out to determine the smallest identifiable amplitude of the test pulses. The smallest identifiable amplitudes of the test pulses depends on the temperature of the disc. The amount of energy required to heat the disc to the desired temperature is determined based on the smallest identifiable amplitudes of the test pulses which have been read out of the disc.

Another one of the heating means may write a test pulse signal comprising a single test pulse having the reference amplitude into a disc by means of a laser beam amplitude-modulated with the test pulse signal. Thereafter, the test signal is read out. If the signal read out does not include the test pulse, the disc is heated to some extent. Then, the test pulse is again written in a similar manner, and, thereafter, whether the test pulse is identifiably written is determined. If the test pulse is not yet included in the output signal, the disc is heated again. This procedure is repeated until the test pulse is detected in the read out signal.

As described above, according to the present invention, prior to writing desired information into a magneto-optic disc, a test pulse signal is written and read out, and, if necessary, the disc is heated in accordance with the read out signal to a temperature within the desirable temperature range so that the laser producing a laser beam for writing the desired information into the disc is prevented from being overloaded.

When a test pulse signal comprising a plurality of different amplitude test pulses is written into a disc, a relatively small amplitude test pulse may be written into the disc when the disc temperature is relatively high. On the other hand, if the disc temperature is relatively low, only test pulses having relatively large amplitudes can be written. The smallest amplitude of the test pulses which can be written into the disc depends on the disc temperature, as stated previously.

By controlling the thermal energy for heating the disc in accordance with the smallest amplitude of the test pulses which are read out from the disc, the disc can be properly heated to a temperature within the desirable temperature range, which enables the laser to operate at a proper operating level to provide reliable recording of information into the disc. Furthermore, the disc is prevented from being overheated.

When a test pulse signal comprising only a single pulse having the reference amplitude is used, the test pulse can be written into the disc if the disc temperature is within the desirable temperature range. However, if the disc temperature is below the desirable temperature range, it cannot be written into the disc.

Thus, if the disc temperature is below the desirable temperature range, the procedure of writing the test pulse into and reading the test pulse from the disc and heating the disc is repeated until the test pulse appears in the output. When the test pulse is read out from the disc, one can know that the disc has attained a temperature within the desirable temperature range. After that desired information signals are written into the disc, so that it is possible to operate the laser at a reasonable operating level to record the information reliably and, at the same time, it is possible to eliminate the possibility of the disc being overheated.

BRIEF DESCRIPTION OF THE DRAWINGS

FIG. 2 shows part of a magneto-optic disc for use with the system of the present invention;

FIGS. 3(a), 3(b) and 3(c) show examples of signal waveforms recorded in and read out from the disc in the first embodiment;

FIG. 5 shows another example of the heating means which is different from the one shown in FIG. 1;

FIG. 6 shows still another example of the heating means useable in the present invention;

FIG. 7 shows a still further example of the heating means which can be used in the present invention.

DETAILED DESCRIPTION OF THE INVENTION

Figure 1:
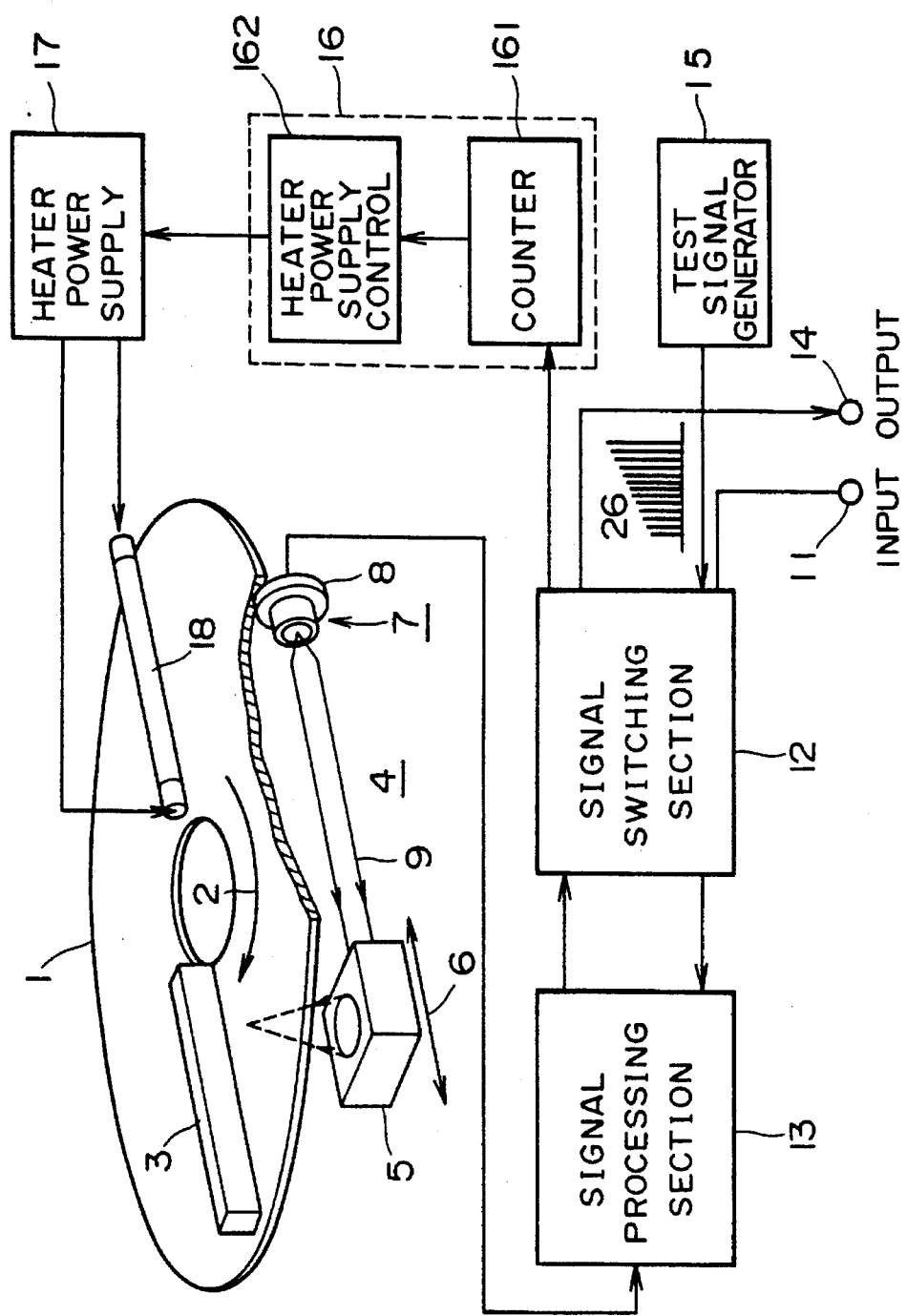
FIG. 1 is a partially cut-away, perspective view of a magneto-optic recording system according to a first embodiment of the present invention, including a circuit for controllably pre-heating a magneto-optic disc.

In FIG. 1, a magneto-optic disc 1 includes a magneto-optic recording layer on the lower surface thereof and is rotated by a suitable driving mechanism (not shown). Above the upper surface of disc 1, an elongated permanent magnet 3 is disposed adjacent to the upper surface of disc 1. Permanent magnet 3 extends along a radius of disc 1. Below disc 1 opposite to magnet 3, a movable unit 5 of a pickup device 4 is disposed. Movable unit 5 is bidirectionally movable in the radial directions indicated by a double-headed arrow 6. For simplicity, the driving mechanism for magneto-optic disc 1 and a mechanism for moving pickup movable unit 5 are not shown.

In addition to movable unit 5, pickup device 4 includes a stationary portion 7 in which a semiconductor laser 8 is disposed. A beam of light 9 emitted by semiconductor laser 8 is focused onto disc 1 by an optical system (not shown) disposed in movable unit 5. An input signal to be written into disc 1 is applied to a terminal 11 and coupled through a signal switching section 12 and a signal processing section 13 to semiconductor laser 8 for modulating laser beam 9, whereby the input signal is written into disc 1. A signal is read out from disc 1 by pickup device 4 and is coupled through signal processing section 13 and signal switching section 12 to a terminal 14.

A test pulse signal generator 15 generates a test pulse signal 26 as shown in FIG. 3(a) comprising a number of pulses having different pulse amplitudes including the amplitude (level) Po indicative of the level at which semiconductor laser 8 can safely operate continuously to provide reliable information recording. Test pulse signal generator 15 is coupled to semiconductor laser 8 through signal switching section 12 and signal processing section 13, whereby its output is written into disc 1. The written test pulses are read out by pickup device 4 and coupled through signal switching section 12 and signal processing section 13 to a level discriminating section 16. Then the number of pulses in the read out signal 26 is counted in a counter 161 in the discriminating section 16 to determine the lowest level written in disc 1. A heater power supply 17 is controlled by a heater power supply control section 162 of discriminating section 16 in accordance with the result of the determination. An elongated heater 18, which is, in this example, a resistance heater, is disposed facing disc 1 and supplied with power from the controlled heater power supply 17. Although heater 18 is shown disposed above disc 1, it may be disposed beneath disc 1.

As shown in FIG. 2, the surface of disc 1 in which information is recorded (i.e. the downward facing surface of disc 1 in the example shown in FIG. 1) is segmented into a plurality of address sections 21 and a plurality of data recording sections 22. There are provided a number of tracks 23 each of which extends over one address section 21 and one data recording section 22 adjacent thereto. A signal to be written in each track 23 may comprise an address portion 24 and a signal portion 25 as shown in FIG. 3(a).

According to the present invention, prior to writing information into a track 23 which has been accessed by an address section 24, test pulse signal 26 as shown in FIG. 3(a) is written. Alternatively, a dedicated track for writing a test pulse signal therein may be formed. As stated previously, test pulse signal 26 comprises a plurality of test pulses having different levels (amplitudes) including a pulse having a pulse amplitude. Po which indicates the writing level desirable for the semiconductor laser used.

If the temperature of disc 1 is high enough, test pulses each having a level substantially lower than the level Po can be written into disc 1. Consequently, as shown in FIG. 3(b), substantially all test pulses in test pulse signal 26 appear in the read out test pulse signal 27. On the other hand, if disc 1 is at a low temperature, no pulses or only some of test pulses which have significantly high levels are written, and, as a result, when test pulse signal 26 is read out, no test pulses are read out or only some of the test pulses in test pulse signal 26 appear in read out signal 27, as shown in FIG. 3(c).

Level discriminating section 16 counts in its counter 161 the number of test pulses which have been read out from disc 1. The number of test pulses read out and, hence, the count counted by counter 161 depend on the temperature of disc 1. The count counted when disc 1 is at the temperature allowing the test pulse having the amplitude Po to be written is $N_0$. If disc 1 is at a higher temperature, the count may be, for example, $N_1$ (FIG. 3(b)) which is greater than $N_0$. The count for a lower disc temperature is expressed as $N_2$ which is smaller than $N_0$, as shown in FIG. 3(c). Accordingly, if the count is not greater than $N_0$, the heater power supply control section 162 is controlled in accordance with the count, which causes heater 18 to be energized to heat disc 1 in accordance with the count, so that semiconductor laser 8 can operate to write information with its output being at level Po or so. Then, normal operation to record desired information signals into disc 1 can be started. If, on the other hand, the pulse count is greater than $N_0$, heater 18 need not be energized, and normal writing operation can be started immediately.

Figure 4:
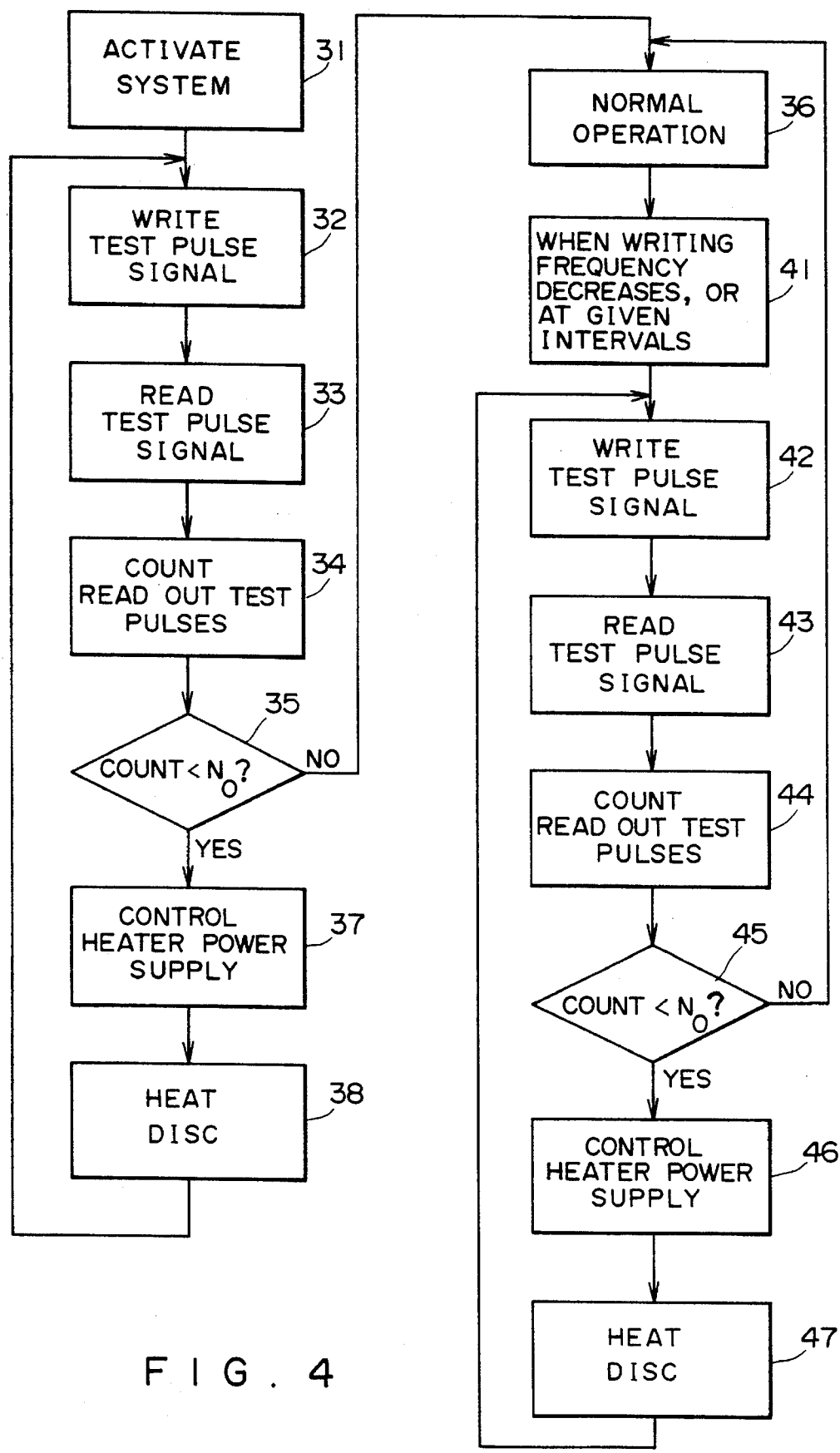
FIG. 4 is a flow chart showing the disc temperature measuring operation carried out prior to normal information writing in accordance with the first embodiment of the present invention.

FIG. 4 is a flow chart of a computer program for controlling the heating operation.

In Step 31, the system is activated. In Step 32, test pulse signal 26 shown in FIG. 3(a) is written into disc 1. The thus written signal is read out from disc 1 in Step 33, and the the number of test pulses read out is counted in Step 34. In Step 35, the count is compared with count $N_0$ shown in FIG. 3(a). When the count is equal to or larger than count $N_0$, or, in other words, when the test pulse written at the level Po is read out, the program advances to Step 36, and normal operation takes place to write desired information into disc 1.

If, at Step 35, it is determined that the count is less than $N_0$ or, in other words, the test pulse written at the level Po is not read out, the program advances to Step 37. In step 34, heater 18 is energized at a power determined in accordance with the count to heat disc 1, and, after that, test pulse signal 26 is written again in Step 32. In Step 33, the thus written signal 26 is read out, and the number of read out test pulses is counted in Step 34. In Step 35, it is confirmed that the count is equal to or greater than $N_0$, and the program advances to Step 36 and normal operation takes place.

After the system enters into the normal operation in Step 36, a test pulse signal is written into disc 1 in Step 42 in a similar manner to Step 32, during time periods when the frequency of writing information into the disc is decreased, or, alternatively, at a predetermined time interval, as indicated in Step 41. Thereafter, Steps 43, 44, 45, 46, and 47 which are similar to Steps 33, 34, 35, 37, and 38 are followed to heat the disc when it is necessary. Then, the normal operation is resumed in Step 36.

FIG. 5 shows disc heating means different from the one shown in FIG. 1. In FIG. 5, the same reference numerals as used in FIG. 1 represent similar items or functions. On the side of a pickup movable unit 5' opposite to signal writing/reading semiconductor laser 8, another semiconductor laser 51 is disposed for heating disc 1. Movable unit 5' is similar to unit 5 shown in FIG. 1, except that it is arranged to direct light beams 9 and 52 from lasers 8 and 51 toward disc 1.

It should be noted that light beam 9 from semiconductor laser 8 must be focused onto disc 1, but light beam 52 from semiconductor laser 51 need not necessarily be finely focused on disc 1 since the function of beam 52 is only to heat disc 1. Semiconductor laser 51 is controlled by a circuit similar to the one shown in block diagram in FIG. 1, in a similar manner to heater 18 to thereby properly heat disc 1.

FIG. 6 shows still another form of the disc heating means. In FIG. 6, too, the same reference numerals as used in FIG. 1 represent similar items or functions. In the arrangement shown in FIG. 6, a dual-beam semiconductor laser array 53 is used in place of semiconductor laser 8 of FIG. 1. Laser array 53 emits a heating light beam 54 in addition to signal writing/reading light beam 9. Beam 54 is focused at a focus point 55 near a focus point 28 of signal writing/reading beam 9 on disc 1, but it need not be exactly focused onto disc 1. Dual-beam semiconductor laser array 53 is controlled in a similar manner to heater 18 of FIG. 1 to properly heat disc 1.

FIG. 7 shows still another disc heating means. A plurality of heater semiconductor lasers 56, 57, 58, 59, and 60 are disposed to emit laser light beams toward disc 1. The lasers 56, 57, 58, 59, and 60 are radially spaced from each other in the named order from the outer periphery of disc 1 toward its center. The locations of these lasers are selected such as not to interfere with the movement of movable unit 5 shown in FIG. 1. It is not necessary to describe operation of this arrangement, but it should be noted that this heating arrangement is also controlled in a similar manner as heater 18 of FIG. 18 to properly pre-heat disc 1.

Figure 8:
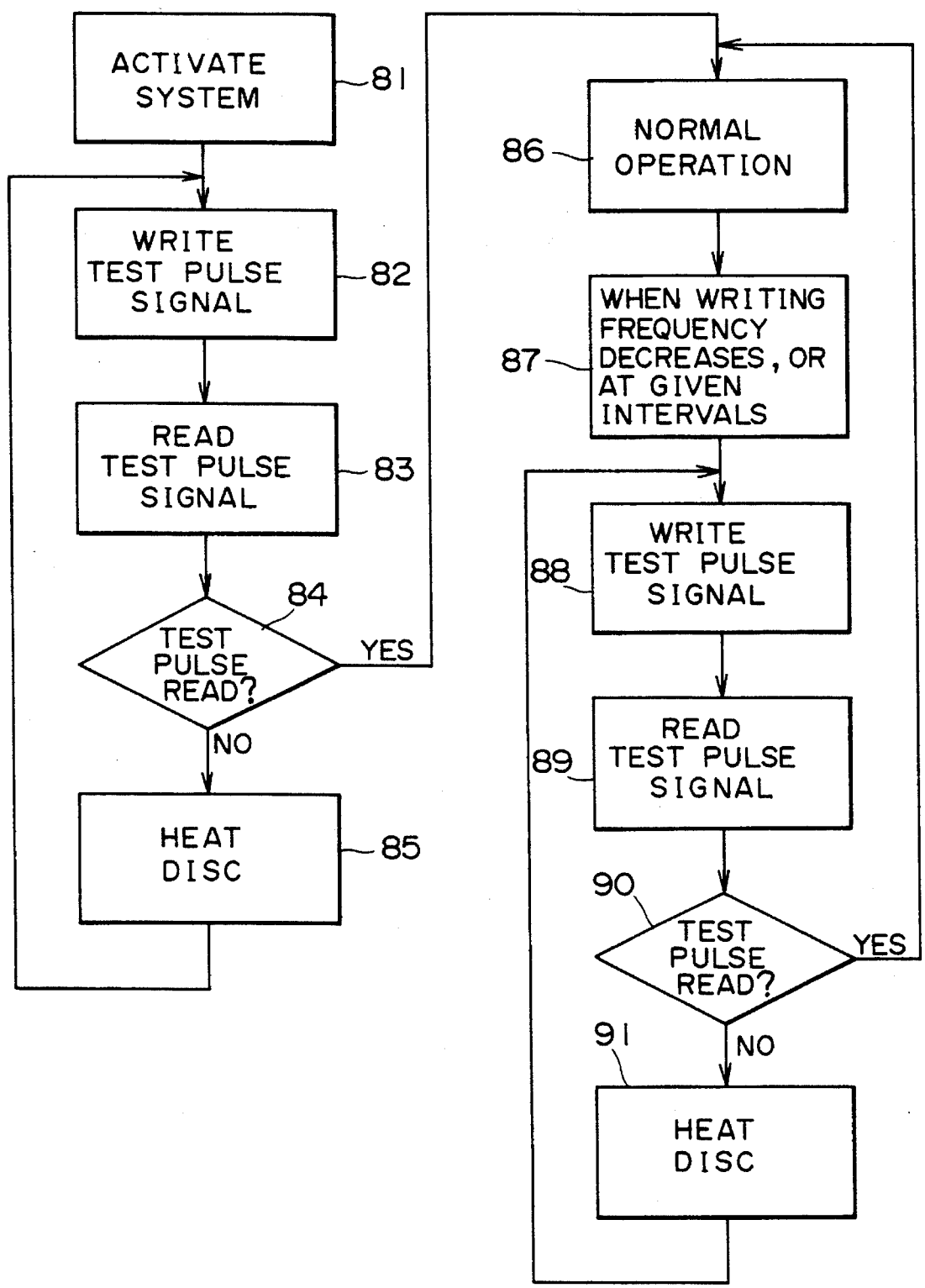
FIG. 8 is a flow chart showing the disc temperature measuring operation according to a second embodiment of the present invention.

FIG. 8 illustrates a flow chart for computer-controlling the pre-heating of a disc in a system similar to the one shown in FIG. 1, in which a test pulse signal comprising a single pulse having a pulse amplitude Po, rather than a number of test pulses shown in FIG. 3(a), is used.

In Step 81, the system is activated. In Step 82, a test pulse signal is written into a disc. In Step 83, the test pulse signal is read out, and in Step 84, whether the test pulse signal has been read out is determined. If the test pulse signal is not detected in Step 84, the program advances to Step 85, and a predetermined amount of thermal energy is applied to the disc by heating means. After the disc is heated, the program returns to Step 82 where a test pulse signal is written again. The thus written signal is read out in Step 83. This operation of heating, writing a test pulse signal and reading the written test pulse signal is repeated until the written test pulse signal is detected in Step 84. When the test pulse signal is detected in Step 84, the system enters into its normal operation in Step 86.

In normal operation, when the frequency of information writing operation decreases, the disc temperature decreases. Accordingly, when the number of information writing operations decreases, or alternatively, at a predetermined time interval, Steps 88, 89, 90, and 91 similar to Steps 82, 83, 84, and 85 are executed to keep the disc at a desired temperature.

In this embodiment, any heating means, such as the ones shown in FIGS. 1, 5, 6, and 7, may be used.

As described above, according to the present invention, the semiconductor laser is not overloaded and, therefore, the reliability of the laser is maintained. In addition, information already recorded in a magneto-optic disc is prevented from being erased due to improper heating of the disc.

What is claimed is:

1. A magneto-optic recording system comprising:

means for applying a magnetic field to a magneto-optic disc;

a pickup including means for directing a writing/reading laser beam to selected locations on the disc;

means for amplitude-modulating the laser beam with a test pulse signal comprising at least one test pulse to write the test pulse signal into the disc;

means for reading the test pulse signal written into the disc from the disc;

means for heating the disc; and means for controlling the means for heating in response to the test pulse supplied from the means for reading.

2. A magneto-optic recording system comprising:

means for applying a magnetic field to a magneto-optic disc;

a pickup including means for directing a writing/reading laser beam to selected locations on the disc;

means for amplitude-modulating the laser beam with a test pulse signal comprising a plurality of test pulses having different amplitudes to write the test pulse signal into the disc;

means for reading the test pulse signal written into the disc from the disc and determining the smallest amplitude test pulse read from the disc;

means for heating the disc; and means for controlling the means for heating in response to the smallest amplitude test pulse supplied from the means for reading.

3. The magneto-optic recording system according to claim 1 wherein said means for heating is a resistance heater facing said disc.

4. The magneto-optic recording system according to claim 1 wherein said means for heating is a semiconductor laser facing said disc.

5. The magneto-optic recording system according to claim 1 wherein said means for heating is a semiconductor laser coupled to said pickup so that a heating laser beam generated by the semiconductor laser is superimposed on said writing/reading laser beam for heating said disc.

6. The magneto-optic recording system according to claim 5 wherein said means for heating is a dual-beam semiconductor laser for generating two laser beams, one of the two beams generated by said dual-beam semiconductor laser being used for signal writing/reading and the other of the two beams being used for heating said disc.

7. A magneto-optic recording system comprising:

means for applying a magnetic field to a magneto-optic disc;

a pickup including means for directing a writing/reading laser beam to selected locations on the disc;

means for amplitude-modulating the laser beam with a test pulse signal comprising a test pulse having a predetermined amplitude to write the test pulse signal into the disc;

means for reading the test pulse signal written into the disc from the disc;

means for determining whether the test pulse written into the disc has been read from the disc;

means for heating the disc; and means for controlling the means for heating when the test pulse written into the disc has not been read from the disc.

8. The magneto-optic recording system according to claim 7 wherein said means for heating is a resistance heater facing said disc.

9. The magneto-optic recording system according to claim 7 wherein said means for heating is a semiconductor laser facing said disc.

10. The magneto-optic recording system according to claim 7 wherein said means for heating is a semiconductor laser coupled to said pickup so that a heating laser beam generated by the semiconductor laser is superimposed on said writing/reading laser beam for heating said disc.

11. The magneto-optic recording system according to claim 10 wherein said means for heating includes a dual-beam semiconductor laser for generating two laser beams, one of the two beams generated by said dual-beam semiconductor laser being used for signal writing/reading and the other of the two beams being used for heating said disc.

\* \* \* \* \*